United States Patent [19]

Takahashi et al.

[11] Patent Number: 4,929,404

[45] Date of Patent: May 29, 1990

[54] GRAPHITIC OR CARBONACEOUS MOLDINGS AND PROCESSES FOR PRODUCING THE SAME

[75] Inventors: Kunimasa Takahashi, Ichikawa; Takashi Kameda, Ami; Haruo Shibatani, Sakura, all of Japan

[73] Assignee: Mitsubishi Petrochemical Company Limited, Tokyo, Japan

[21] Appl. No.: 196,760

[22] Filed: May 17, 1988

Related U.S. Application Data

[63] Continuation of Ser. No. 779,590, Sep. 24, 1985, abandoned.

[30] Foreign Application Priority Data

Sep. 25, 1984 [JP] Japan ................... 59-199737
Dec. 3, 1984 [JP] Japan ................... 59-255270
Mar. 29, 1985 [JP] Japan ................... 60-63329
Apr. 23, 1985 [JP] Japan ................... 60-87264

[51] Int. Cl.$^5$ .................. C10C 3/00; B29C 43/52
[52] U.S. Cl. .................. 264/29.5; 264/29.1; 264/29.7; 264/101; 264/DIG. 20; 208/44
[58] Field of Search ........ 264/29.5, 29.6, 29.1, 264/29.7, 101, DIG. 20; 423/447.4, 445; 208/44

[56] References Cited

U.S. PATENT DOCUMENTS

| | | | |
|---|---|---|---|
| 4,208,267 | 6/1980 | Diefendorf et al. | 208/45 |
| 4,226,281 | 10/1980 | Ishikawa et al. | 264/29.5 |
| 4,226,900 | 10/1980 | Carlson et al. | 264/29.5 |
| 4,395,299 | 7/1983 | Riggs et al. | 264/29.5 |
| 4,534,949 | 8/1985 | Glaser et al. | 264/29.5 |
| 4,567,007 | 1/1986 | Harder | 264/29.5 |

FOREIGN PATENT DOCUMENTS

| | | | |
|---|---|---|---|
| 0932387 | 7/1963 | United Kingdom | 264/29.5 |
| 1138307 | 1/1969 | United Kingdom | 264/29.5 |

*Primary Examiner*—Hubert C. Lorin
*Attorney, Agent, or Firm*—Emmanuel J. Lobato; Robert E. Burns

[57] ABSTRACT

A graphitic or carbonaceous molding comprising graphite powder and a mesophase-containing pitch is obtained by suspending graphite powder in a tar, heating the suspension while blowing an inert gas therein to form the mesophase-containing pitch on the graphite particles to obtain carbonaceous precursors and molding/carbonizing or graphitizing the carbonaceous precursors.

31 Claims, No Drawings

GRAPHITIC OR CARBONACEOUS MOLDINGS AND PROCESSES FOR PRODUCING THE SAME

This is a continuation of application Ser. No. 779,590, filed Sept. 24, 1985, now abandoned.

BACKGROUND OF THE INVENTION

1. Field of the Invention

This invention relates to, among others, graphitic molded articles or moldings comprising, essentially, graphite powder and mesophase-containing pitch and to processes for producing the same.

2. Technical Background of the Invention

In the prior art, in the production of graphitic moldings using graphite as the base material, methods in which coal tar pitch, phenol resin, furan resin, etc., are used as the binder for graphite have been known.

When coal tar pitch, phenol resin, etc. are used as the binder, because the melting point of the binder is as low as around 100° C., heating and kneading with the base material and molding can be performed relatively easily. On the other hand, however, these binders are disadvantageous in that they cause a low carbonization yield such as 50 to 60 wt. % in carbonization at up to about 1,000° C., in that the amount of shrinkage accompanying carbonization is great, and also in that shrinkage strain is caused when high speed carbonization is carried out. Further, when a green molding with a complicated shape is carbonized, a problem arises in that complicated deformations due to the difference in amount of shrinkage will occur in the molding obtained.

Now, a phosphoric acid type fuel cell, on which research for practical application is being undertaken on a large scale in United States of America and Japan, employs hot phosphoric acid at around 200° C., and hence its electrode substrates and gas separators are both constituted of carbon materials with low electric resistance and high resistance to hot phosphoric acid. In this connection gas impermeability is a very important requirement for the gas separators to be used in fuel cells.

3. Prior Art and its Problems

As a gas impermeable carbon material to be used for a gas separator in a fuel cell, a glassy carbon material has hitherto been proposed. For example, in Japanese Patent Laid-Open Publication No. 150275/1983, an example of using a glassy carbon alone is described, and in Japanese Patent Laid-Open Publication No. 72273/1982, carbonization (1,000° C.) of a green molding of graphite and phenol resin is carried out for a long period of 168 hours with application of a certain load on the molding, and further the temperature is elevated up to 2,800° C. over 48 hours to obtain a graphitized separator. Also, in Japanese Patent Laid-Open Publication No. 127377/1984, a material with a thickness after calcination of 0.1 to 1 mm, obtained from furan resin to which ultra-fine carbon black powder has been added and admixed according to necessity by molding to a desired thickness, and then curing at room temperature, is placed between graphite plates or the like of excellent thermal conductivity with form-retaining characteristics and is carefully calcined for uniform calcination to obtain a glassy carbon thin plate.

However, according to any of these processes, no epoch-making countermeasure has been adopted to cure the problem of deformation of the molding, which is due to volume shrinkage accompanying the characteristic of a carbonization yield of 50 to 60 wt. % of the phenol resin or the furan resin, which is the starting material for glassy carbon for carbonization up to about 1,000° C.

Also, concerning gas separators, in addition to the flat plate as disclosed in the above techniques, the so called ribbed separator, having divided gas channels crossed at right angles on both sides of the plate, has also been proposed. However, the difficulty in producing in one step a gas separator having such a complicated shape by carbonization of a green molding with the use of graphite as the base material and a phenol resin as the binder is suggested by Japanese Patent Laid-Open Publication No. 140977/1983. That is, according to said Publication, deformation or warping of the plate will occur because of the grooves constituting a large number of gas channels in such a complicated shape as the ribbed separator, and hence a process for carbonization is disclosed in which the coefficient of shrinkage of the green molding during carbonization is previously measured and powders with various formulations of graphite and phenol for respective potions are placed in the mold before carbonization. However, in another application by the same applicant (Japanese Patent Laid-Open Publication No. 119163/1983), the poor yield of the powder filling method is pointed out, and a method in which gas separators are made into flat plates is proposed. Also, according to Japanese Patent Laid-Open Publication No. 150275/1983, in order to obtain a ribbed separator with a furfuryl alcohol resin alone according to a certain process, there is disclosed a method in which a mold for centrifugal molding is formed in conformity with the degree of shrinkage.

However, the gas separator obtained by the technique disclosed in Japanese Patent Laid-Open Publication No. 72273/1982 cannot but be expensive, while according to the methods disclosed in Japanese Patent Laid-Open Publication Nos. 140977/1983 and 150275/1983, since the amount of shrinkage which changes continuously and finally is determined approximately, the dimensional precision will become unstable, and the work must inevitably become complicated.

For practical application of phosphoric acid type fuel cells, there is a great need to overcome the various technical difficulties concerning gas separators as described above.

SUMMARY OF THE INVENTION

On the basis of the knowledge concerning graphitic moldings as described above, we have carried out investigations on the method for producing a graphitic molding which has low electrical resistance and high dimensional stability by high-speed carbonization at 1,000° C. or lower temperature. As a result, it has now been found that a graphitic molding having the properties of a volume resistivity of 5.0 mΩ·cm or less, a flexural strength of 200 kg/cm$^2$ or higher, preferably 300 kg/cm$^2$ or higher, a volume shrinkage of 3% or less, preferably 2% or less, and a weight change of 3% or less, preferably 2% or less, can be obtained with carbonization at 1,000° C., by mixing 5 to 50 parts by weight, preferably 10 to 30 parts by weight of a binder, which is a mesophase-containing pitch satisfying at the same time the various characteristics of at least 70 wt. %, preferably at least 80 wt. % of the carbonization yield in carbonization up to 1,000° C., content of quinoline insolubles of 70 wt. % or less, preferably 60 wt. % or less, mesophase content of 40% or more, preferably 70% or more, and, further, a melting temperature of 400° C. or lower, with 100 parts by weight of graphite powder, filling a mold with the resultant powder in a required amount, compression molding this powder to obtain a green molding, and carbonizing the green molding in an inert atmosphere. The present invention has been developed on the basis of this finding.

Furthermore, the present invention has been accomplished also by our discovery that such a graphitic molding can be produced according to several other processes.

An object of the present invention is to overcome the problems as described above and provide a graphitic molding having excellent dimensional stability and denseness.

More specifically, the present invention concerns a graphitic molding, having a specific resistivity of 5.0 $m\Omega\cdot cm$ or less and a flexural strength of 200 kg/cm$^2$ or higher and undergoing a volume change of 3% or less and a weight change of 3% or less when carbonized at 1,000° C.

The present invention also concerns processes for producing such a graphitic molding.

The first process, namely the process (I), is for producing the above defined graphitic molding and comprises pressure molding the powder obtained by mixing graphite powder with a mesophase-containing pitch, having 70% by weight or less of a fraction insoluble in quinoline, 40% or more of mesophase content, an upper limit of melting temperature of 400° C. and a carbonization yield at 1,000° C. of at least 70% by weight to obtain a green molding, and further calcining said green molding at 700° C. or higher temperature in an inert atmosphere.

The second process, namely the process (II), is for producing a carbonaceous or graphitic composite molding comprising a filler of at least one material selected from graphitic carbon, carbonaceous carbon, inorganic compounds, metals and metal compounds, and a carbonaceous or graphitic material derived from a mesophase-containing pitch and comprises the four steps of:

(1) suspending of filler comprising at least one material selected from graphitic carbon, carbonaceous carbon, inorganic compounds, metals and metal compounds in a tar containing a mesophase pitch precursor;

(2) heating the resulting suspension system to evaporate light fractions contained in the tar distillate by blowing of an inert gas into the suspension or subjecting it to a reduced pressure and subjecting the mesophase pitch precursor to heat treatment at 350° to 500° C. to obtain a carbonaceous precursor having a mesophase-containing pitch containing 5 to 90% of the fraction soluble in quinoline formed on the surface of said material;

(3) molding the carbonaceous precursor into a green molding containing mesophase-containing pitch; and (4) providing the green molding for carbonization or graphitization reaction in an inert atmosphere to incorporate the carbonaceous or graphitic material derived from the mesophase-containing pitch therein.

The third process, namely the process (III), is for producing a graphitic molding and comprising the steps of:

(1) suspending graphite powder in a tar containing a mesophase pitch precursor;

(2) heating the resulting suspension system at 350° to 550° C. while blowing an inert gas thereinto or subjecting it to a reduced pressure thereby to obtain a carbonaceous precursor having mesophase pitch formed on the surface of graphite particles;

(3) pressure molding the carbonaceous precursor at 400° to 800° C. into a green molding; and (4) carbonizing or graphitizing this green molding in an inert atmosphere.

The fourth process, namely the process (IV), is for producing a graphitic molding and comprising the steps of:

(1) suspending graphite powder in a tar containing a mesophase pitch precursor;

(2) heating the suspension thus obtained at 350° to 550° C. while blowing an inert gas thereinto or subjecting the suspension to a reduced pressure to obtain a carbonaceous precursor having mesophase pitch formed on the graphite particles; and (3) pressure molding the carbonaceous precursor at 800° to 3,000° C.

DETAILED DESCRIPTION OF PREFERRED EMBODIMENTS

Graphitic Molding

The graphitic molding according to the present invention has a specific resistivity of 5.0 $m\Omega\cdot cm$ or less and a flexural strength of 200 kg/cm$^2$ or higher and undergoes a volume change of 3% or less and a weight change of 3% or less when carbonized at 1,000° C.

The molding may also contain an inorganic compound, a metal and (or) a metal compound as shown below in the process (II). Also, the graphitic moiety of the graphitic molding may consist of a moiety derived from the non-graphitic precursors (particularly pitch) and graphite powder dispersed therein.

In the above discussion concerning the prior art and its problems, the specific features of the graphitic molding of the present invention may be shown by referring to, for example, the technique for preparation of gas separator for phosphoric acid type fuel cell. However, examples of uses other than the gas separator, which is the most preferable use of the molding of the present invention, can also be shown.

Specific examples of the fields of use are graphitic tubes, graphitic crucibles and boats, graphite electrodes for electrolysis, redox flow type cells, and bipolar plates.

In any of these fields, by utilizing fully the characteristics of the graphitic molding of the present invention such as good electroconductivity, dimensional stability, denseness, etc., it is possible to create an article satisfying simultaneously, the requirements of high performance and low cost to an extent unexpected from the prior art.

Process (I) for Production of Graphitic Molding

The graphite powder to be used in the process (I) of the present invention can be selected from artificial graphite and/or natural graphite.

The graphite powder to be used in the present invention should preferably have the characteristic of being capable of producing a green molding with the shape of an appropriate mold; when the mold is filled therewith, the powder is pressure molded at room temperature, and then is taken out from the mold (hereinafter sometimes called "self-moldable characteristic"). Although, even by use of graphite powder having the characteristic of being disintegrated into masses or particles when taken out from the mold, a desired green molding or graphitic molding by carbonization can be obtained by heating molding with the use of the mesophase-containing pitch according to the process of the present invention, the specific resistivity value of the graphitic molding obtained will be greater than that when graphite with a self-moldable characteristic is used, and the dimensional stability will be poor to make the molding unsuitable for the fields in which good electroconductivity and dimensional stability are particularly required.

Examples of self-moldable graphites are flake type powdery graphite such as CPB and ASP-1000 (trade names) produced by Nippon Kokuen Kogyo K.K. and powdery graphite such as KS-2.5 (trade name) produced by LONZA Co.

The mesophase-containing pitch to be used in the present invention can be prepared from coal tar, petroleum residual tar (decant oil), naphtha-cracked residual tar, etc. Among these, hydrogen-treated naphtha-cracked residual tar obtained by treatment of naphtha-cracked residual tar with hydrogen, because of its feature of a markedly small content of impurities such as heavy metals, sulfur, etc., can be considered as a preferable starting material for the binder of the graphitic molding, which is to be used in the presence of elements which will promote oxidation or decomposition of the carbonaceous material such as the gas separator of a phosphoric acid type fuel cell (not phosphoric acid and hot air around 200° C., direct current).

For obtaining the mesophase-containing pitch suitable for the present invention from the carbonaceous pitch obtained from the tower bottom oil formed by catalytic cracking of the hydrogen-treated naphtha-cracked pitch or petroleum distillate and coal tar pitch, it is possible to use either a heat treatment under reduced pressure (Japanese Patent Laid-Open Publication Nos. 154792/1983, 142974/1983) with blowing of an inert gas (Japanese Patent Laid-Open Publication Nos. 154793/1983, 142975/1983), or a heat treatment with blowing in of an inert gas in the co-presence of a hydrogen donating compound (Japanese Patent Laid-Open Publication No. 155493/1984). However, the method of Japanese Patent Laid-Open Publication No. 155493/1984 can readily produce the mesophase-containing pitch satisfying the various characteristics as defined in the Claims of the present invention (70 wt. % or less of quinoline insolubles as determined by the JIS K-2425 centrifugal method, 40% or more of mesophase content, 400° C. or lower of the upper limit of the melting temperature of the pitch, at least 70 wt. % of the carbonization yield up to 1,000° C. by use of a differential thermogravimetric device at a temperature elevation speed of 10° C./min. under nitrogen gas stream). Other techniques for production of mesophase-containing pitch may also be applicable.

If the quinoline insolubles in the mesophase-containing pitch exceed 70 wt. %, because the melting temperature of the pitch may sometimes exceed 400° C. and the content of the components which will not be melted will be increased, it becomes difficult to impart high flexural strength or resistance to hot phosphoric acid, obtained by filling the gaps among the graphite particles with molten mesophase pitch by pressure molding at a temperature higher than the melting temperature of the mesophase-containing pitch, which is one of the embodiments of the present invention.

Since a mesophase-containing pitch with less than 40% of the mesophase content contains a large amount of low boiling-point distillates, the amount of gas generated during carbonization is increased, whereby the formation of a graphitic molding of high denseness due to a high carbonization yield of the mesophase-containing pitch, which is a specific feature of the present invention, will be markedly impaired, due to the formation of swelling or fine pores.

A mesophase-containing pitch with a melting temperature over 400° C. will generate gas during heat molding to impair moldability, and its characteristics as a binder will deteriorate by causing a reduction in strength of the green molding and the graphitic molding.

The graphite powder to be used in the present invention should desirably be molded after the grinding mixing step with the mesophase-containing pitch. A starting powder more suited for the objects of the present invention can be obtained by grinding and mixing the graphite powder with mesophase-containing pitch powder previously pulverized to 100 mesh or less by means of a device having the two functions of grinding and mixing such as a ball mill or a vibrating mill. Simple mixing by means of a V-blender or the like is also possible by omitting grinding, but grinding-mixing is desirable for obtaining a more dense molding.

The mesophase-containing pitch can be added in an amount of 5 to 50 parts by weight, preferably 10 to 40 parts by weight per 100 parts by weight of the graphite powder. The optimum addition ratio differs depending on the mesophase-containing pitch employed.

Pressure molding can be performed according to a conventional method.

When pressure molding is performed by the use of a mold with greater coefficient of thermal expansion than the starting powder such as a mold made of stainless steel, compressive force will act on the green molding during the cooling operation, whereby cracks or even breakage in extreme cases may be caused in the case of a thin plate, and therefore a measure such as adapting the mold so that the dimensions at the outer peripheral portion thereof can be changed is desirable.

The compressive force to be applied on the mold is preferably within the range of from 10 to 3,000 kg/cm$^2$ (gauge), more preferably from 100 to 3,000 kg/cm$^2$ (gauge), particularly from 100 to 2,000 kg/cm$^2$ (gauge). With a molding pressure less than 10 kg/cm$^2$ (gauge), the molding has low strength and is difficult to handle. On the other hand, even if a pressure greater than 3,000 kg/cm$^2$ (gauge) is applied, the bulk density and strength of the molding will not differ greatly from those of a molding obtained by application of an appropriate pressure less than 3,000 kg/cm$^2$ (gauge), and application of such a great pressure is not preferred in the case of the production of a green molding with a large area because the capacity of the pressing machine must be increased.

Also in the case of heat molding, in obtaining a green molding, a pressure of 10 to 3,000 kg/cm$^2$ (gauge) can be applied at room temperature on the powder filling the mold to enhance the powder filling density, whereby the amount of oxygen copresent in the powder can be reduced. By this operation, it is possible to suppress undesirable reactions such as conversion of the pitch to an infusible product and oxidation of graphite by oxygen contained in the powdery system during the heating process step to the melting temperature and during the retaining step at the melting temperature.

After retention at the melting temperature, particularly the melting temperature of the mesophase-containing pitch for a certain period of time, the applied pressure may be restored to atmospheric pressure at any desired temperature region in the course of cooling. However, when an operation to change the outer peripheral dimension is to be carried out, it is required that the pressure be returned to atmospheric pressure before the operation is started. After cooling, the green molding is taken out from the mold and provided for the carbonization reaction. The carbonization reaction is carried out in an inert atmosphere such as that of nitrogen or argon.

The carbonization speed can be selected at 100° to 2,000° C./hour, preferably 300° to 1,500° C./hour. The temperature region of 400° to 600° C. in which the temperature must be raised with the greatest care during carbonization can also be passed at the above speed.

Preferred embodiments of the process (I) are:

the process (I) for producing a graphitic molding comprising the mesophase-containing pitch and graphite, wherein the mesophase content in the mesophase-containing pitch is 70% or more;

the process (I) for producing a graphitic molding comprising the graphite powder and mesophase-containing pitch, which comprises forming the molding by compression molding of the mixed powder of the mesophase-containing pitch and the graphite powder at room temperature under pressurization of 100 to 3,000 kg/cm$^2$; and the process (I) for producing a graphitic molding, which comprises heating the mixed powder of the mesophase-containing pitch and the graphite to the melting temperature of said mesophase-containing pitch or higher.

The meritorious effects of the present invention according to the process (I) are as follows.

(1) Since the residual carbon yield in the mesophase-containing pitch by carbonization up to 1,000° C. is 70 wt. % or more, which is markedly higher than that of the coal tar pitch or phenol resin used in the known techniques of the prior art, the amount of the gas generated during carbonization is small, whereby formation of pores by the generated gas is markedly suppressed to enable marked reduction of the porosity in the graphitic molding. Also, by combination of the mesophase-containing pitch with graphite, the dimensional stability and denseness of the graphitic molding can be improved dramatically, whereby it becomes possible to produce an article with a complicated shape without post-working.

(2) By the use of a mesophase-containing pitch with a mesophase content (determined by observation of the polished surface of the pitch by a polarized light microscope, and calculated from the area ratio of the anisotropic portion to the whole area) of 40% or more, preferably 70% or more, the residual carbon component, when the pitch is carbonized at 800° to 1,000° C., has a structure similar to graphite, whereby the electric resistance of the graphitic molding obtained becomes very much lower than that of a material having a structure which is not easily graphitized such as glassy carbon.

(3) By combination of graphite with a mesophase-containing pitch having the characteristics as a melt type binder of high residual carbon yield and a small amount of gas generation during carbonization, it has become possible to shorten markedly the time required for carbonization. That is, the green molding obtained by the process of the present invention can be formed into a graphitic molding all at once, by a high-speed temperature elevation of 300° to 1,500° C./hour without using various operations which entail great increases in the production cost of industrial processes, as employed in the prior art techniques, in order to maintain flatness, such as carbonization under application of pressure, precarbonization at 400° to 600° C. region, treatment to non-fusibleness at 200° to 400° C. in the air, etc.

Process (II) for Production of Graphitic Molding

Generally speaking, in the case of production of a carbon material such as a graphite electrode, a widely practiced method has been to add 30 to 40 parts by weight of a pitch as the binder to aggregates such as coke, which have no caking ability and cannot produce a pressure-molded product as such, per 100 parts of the aggregates, and thereafter carrying the steps of kneading, molding and calcination. However, in this case, at a temperature in the region of 300° to 600° C. at which the binder pitch is molten and carbonized, a very slow temperature elevation speed of about 1° C./hour is required, and the carbonization yield of the pitch is as low as 50 to 60%, whereby a large amount of pores will be formed. Accordingly, for imparting denseness to the molding, problems are encountered such as the need for reimpregnation of the binder pitch or for a secondary calcination.

For overcoming these problems, various improved methods have been proposed. For example, Japanese Patent Laid-Open Publication No. 24211/1977 describes an improved technique concerning the method for mixing aggregates with the binder pitch.

In said Publication, there is disclosed a process for producing a carbonaceous molding, which comprises mixing powder such as of carbonaceous or graphitic material with pitch, heating the mixture at 350° to 450° C., thereby treating the mixture so that the mesophase formed from said pitch will be 0.3 part by weight per 1 part by weight of the carbonaceous or graphitic material added, then separating the carbonaceous or graphitic powder and the mesophase from the pitch, pressure molding the separated powder and the mesophase as it is, and calcining the molding, or a process for producing a carbonaceous molding comprising a carbonaceous or graphitic material attached with mesophase, which comprises pulverizing the carbonaceous or graphitic material and the mesophase obtained after carrying out heat treatment so that substantially all of the pitch will pass to the mesophase during heat treatment of the pitch, pressure molding the pulverized product as it is, and calcining the molding.

Specific features of these processes are as follows.

(i) Since the mesophase adheres around the additive, no kneading step is required.

(ii) Since the carbonization yield of the mesophase is high and carbonization is effected without passage through the softened and molten states, a high temperature elevation speed of 100° C./hour or higher can be used.

(iii) Since the mesophase formed in the pitch penetrates into small gaps between the particles of carbonaceous or graphitic material, the porosity of the carbonaceous or graphitic material itself will have no effect on the carbonized molding.

Furthermore, Japanese Patent Publication No. 39770/1983 discloses a process for producing a carbonaceous molding, which comprises filtering all or a part of the liquid medium solubles from a slurry comprising carbonaceous aggregates, bituminous materials and a liquid medium to separate a solid therefrom and subjecting the solid after pressure molding to heat treatment. The aggregates suitable for use employed include various kinds of cokes, natural graphite, artificial graphite, carbon black, and carbon fiber, containing desirably powder capable of passing through a sieve of 200 microns in at least half of its amount. As the bituminous material which is the binder, coal tar, coal tar pitch, petroleum pitch, asphalt and mixtures of these may be employed. However, in said invention, a specific characteristic is in the employing of these bituminous materials from which all or a part of the so called γ-resins (quinoline soluble, benzene insoluble components) are removed by a physical or chemical method.

As compared with the method of the prior art, in which no homogeneous molding could be obtained even by formulation of fine powder in order to obtain a dense molding with high strength, because of the difficulty in distributing sufficiently the binder pitch over the surface of the carbonaceous fine powder, the effective caking component in the bituminous material can be dispersed uniformly in the fine powder by said process. When very fine powder such as carbon black is used, while a separate step for distributing the caking component over the carbon black surface is required in the prior art method, simultaneous immersion can advantageously be rendered possible in the process of said invention. Also, the step of requiring 3 to 6 months in the prior art can be shortened to 7 to 10 days according to said process in which direct graphitization is also possible, with an additional advantage in that a good working environment can be maintained because harmful dust or mist generated in the prior art steps such as kneading, cooling, and secondary pulverizing can be dissolved away in an organic medium in said process.

Further, in Japanese Patent Laid-Open Publication No. 24211/1977 in view of the fact that a part of graphitic materials, which are described as being unable to produce pressure moldings as such, can produce moldings by pressurization, we have proposed the process (I) for producing a molding having a specific resistivity of 5 mΩ·cm or less, a flexural strength of 200 kg/cm$^2$ or higher, a volume change of 3% or less and a weight change of 3% or less before and after calcination, which comprises pressure molding the powder obtained by mixing this graphite powder with mesophase-containing pitch powder, having 70 wt. % or less of quinoline insolubles, 40% or more of the mesophase content, 400° C. of the upper limit of the melting temperature and at least 70 wt. % of the carbonization yield at 1,000° C. to obtain a green molding and further calcining the green molding at 700° C. or higher in an inert atmosphere.

The mesophase obtained according to the process as disclosed in Japanese Patent Laid-Open Publication No. 24211/1977 is essentially a quinoline insoluble component, and the volatile component contained therein acts as the caking component during molding at room temperature. The specific feature (ii) as set forth above enables high speed carbonization which could not be accomplished by the use of the binder pitch of the prior art, but it has been reported by the inventors of the invention disclosed in said Publication [Tanso (Carbon), 86, p. 93 (1976)] that the carbonaceous molding obtained by the process of said invention has a porosity of about 15 to 30% and a flexural strength of 120 to 500 kg/cm$^2$ in the calcined product at 1,000° C. Thus, it is shown that no essentially dense molding can be prepared because the mesophase will not be softened by melting and also that, due to the inherently small amount of the binder component, the strength will be markedly lowered as the mesophase content is lowered, and addition of about 65% of mesophase is required for obtaining a flexural strength of 500 kg/cm$^2$ according to said process. Also, a step for separating a large amount of the pitch with an organic solvent such as quinoline is required after formation of mesophase, and the mesophase and the cokes thus separated are further required to pass through the vacuum drying step after washing with benzene and acetone, as disclosed in the Examples. Thus, cumbersome treatment steps are required in the process in place of the kneading step. Further, in the case of converting all of the pitch to the mesophase, a difficult problem appears to lie in the controlling of the amount formed of the metaphase having no caking characteristic.

On the other hand, in the process disclosed in Japanese Patent Publication No. 39770/1983, it is apparent that new problems in the steps arise, such as the requirement for an organic solvent such as benzene and toluene in an amount of 20 to 50-fold that of the aggregates and the requirement for a step for recovery of γ-resins. Also, there is no mention of coating of the mesophase pitch.

Further, in the above process (I), the problem of the lengthy steps required for obtaining the mesophase-containing pitch has remained to be solved.

The process (II) for producing the graphitic molding according to the present invention has been devised in view of the situation as described above. An object of the invention is to provide a process for producing a carbonic composite molding comprising at least one material selected from graphitic carbon, carbonaceous carbon, inorganic compounds, metals and metal compounds, and carbonaceous or graphitic material derived from the mesophase-containing pitch, which molding has excellent strength, high speed carbonizability, dimensional stability, and low electric resistance.

The process (II) comprises the following steps (1), (2), (3), and (4), each described in detail.

(1) The step of suspending the materials in a tar component. The materials to be covered with the mesophase-containing pitch (hereinafter sometimes abbreviated as "filler") used in the present invention are described below.

As the graphitic carbon powder, for example, flake type natural graphite, amorphous natural graphite and artificial graphite can be employed. Further, for making the process of the present invention more effective, a graphite powder capable of forming a molding by pressure molding at room temperature [e.g. CPB and ASP-1000 '(trade names) produced by Nippon Kokuen Kogyo K.K. or KS-2.5 (trade name) produced by LONZA Co.] can be used. As the carbonaceous carbon powder, for example, petroleum coke, coal coke, and carbon black can be employed. Examples of various inorganic compound powders are those of silica-alumina, γ-alumina, α-alumina, silicon carbide and silicon nitride. Examples of suitable metal powders are iron, copper, zinc, tin, nickel, cobalt, lead, aluminum, gold, silver, titanium, platinum, and palladium. These metal powders can be permitted to exist partially or wholly as metal oxide powders or metal compounds before the stage of slurrying and before the stage of incorporation in the green molding. Furthermore, the metal compounds are, for example, $Fe_2O_3$, $ZnO$, $CuO$, $CuCl_2$, $ZnCl_2$, $SnCl_4$, $AlCl_3$, $TiCl_4$ and $Cu(NO_3)_2$.

In practicing the present invention, the filler can be used either singly or as a mixture of two or more kinds. Typical examples of mixed systems of two or more kinds are combinations of graphite and carbon, carbon and an inorganic compound, and carbon and a metal. As a further example of the combination of the fillers, carbon powder previously plated with a metal such as copper or nickel can also be employed.

The mesophase-containing pitch in which such a filler as described above is incorporated is ordinarily obtained from a tar. The tar as the starting material is not required to be limited in kind, but any of coal type tars and petroleum type tars can be used. Although any tar capable of producing a mesophase-containing pitch containing 5 to 90 wt. % of quinoline solubles under operational reaction conditions may be used, the tar species is sometimes selected in accordance with the characteristics demanded for the final product. For example, when it is desired to avoid entrainment of heavy metals or sulfur in the final product, ethylene heavy end tar obtained by naphtha cracking is more preferable than coal tar or heavy component tar of petroleum.

In the case when no slurry can be formed even when an attempt is made to suspend the material only in the tar containing mesophase pitch precursors due to greater oil absorption of the material, an appropriate solvent, for example, the light distillate in the tar recovered in the heat treatment step or quinoline can be suitably added.

As for the amount of the filler relative to the tar component, although the preferable amount to be formulated differs depending on the kinds of tar and filler, it is ordinarily 5 to 1,000 parts by weight, preferably 10 to 800 parts by weight, per 100 parts by weight of the tar.

As for suspension, a conventional method is employed, but when the tar contains a large amount of water which may interfere with complete wetting of the filler surface, it is preferably previously dried and degassed. Also, when the difference in the specific gravities of the tar and the filler is great, it is desirable to avoid separation of the two components.

(2) The step of forming mesophase pitch on the material surface.

The mesophase-containing pitch satisfying the requirements of the present invention can be formed by heating the slurry comprising a tar and a filler at a temperature in the range of from 350° to 500° C., preferably from 400° to 500° C. By elevating the temperature of the slurry up to the reaction temperature in a stream of an inert gas such as nitrogen gas, carbondioxide, or argon, or under a reduced pressure of, for example, 10 to 100 mmHg, maintaining these conditions for a specific period of time, and thereafter cooling the heated product, a composite of the filler and the mesophase-containing pitch can be obtained. The so-called light distillates such as a distillate not converted to mesophase pitch precursors contained in the tar or organic solvent optionally added will be distilled out from the reaction system in the process of temperature elevation and are recovered according to an appropriate method. The temperature elevation speed may be controlled at 1° to 50° C./min. After reaching the reaction temperature, it is necessary to maintain this until the content of the quinoline solubles in the mesophase-containing pitch becomes a desired value, and the maintenance time is closely related with various factors such as the reaction temperature, the temperature elevation speed, the gas flow rate or degree of reduced pressure, the filler material, the kind of the tar, the quinoline soluble content and presence of hydrogen donating material into the reaction system, and should be determined experimentally depending on the materials constituting the present invention as well as their combination.

For the purpose of facilitating control of the quinoline soluble content in the mesophase-containing pitch easier, a compound having hydrogen donating ability is blown together with an inert gas into the reaction system according to the method as disclosed in Japanese Patent Laid-Open Publication No. 155493/1984, or further the tar after modification treatment in the presence of pressurized hydrogen or the copresence of pressurized hydrogen and a catalyst, as disclosed in Japanese Patent Laid-Open Publications Nos. 154792/1983 and 154793/1983, and Japanese Patent Applications Nos. 35563/1984, 97183/1984 and 97184/1984, can be employed as the material for the present invention. When the difference between the specific gravities of the mesophase-containing pitch and the filler is great, the reactants can be fluidized by mechanical stirring or blowing in of an inert gas to cause uniform precipitation for the purpose of avoiding separation between the two components.

The content of quinoline solubles in the mesophase-containing pitch is 5 to 90 wt. %, preferably 20 to 70 wt. %. If the content of quinoline solubles is too small, the caking components during room temperature molding are too small in amount to produce strength in both the green molding and the carbonized molding, and the mesophase-containing pitch cannot be melted at a temperature of 400° C. or lower during heat molding and, undesirably, a dense carbonized molding cannot be produced. On the other hand, if the content of quinoline solubles is excessive, the gas generation during carbonization will be markedly excessive to give rise to undesirable formation of bubbles or deformation during carbonization.

When the heat treatment temperature of the mesophase pitch precursors is lower than 350° C., it will take a long time for formation of mesophase, which is not desirable in the process and control of the quinoline soluble content. On the other hand, when the temperature is higher than 500° C., higher polymerization of quinoline insolubles will be promoted, whereby quinoline insolubles having properties approximating those of coke may exist to undesirably produce no mesophase-containing pitch suitable for heating melt molding as intended by the present invention.

The content of quinoline solubles can be measured according to the JIS K-2425 centrifugal method, but in the composite with a fine filler such as carbon black, carbon black will not be sedimented by centrifugation to be removed as quinoline solubles, whereby errors may be created. Therefore, the content of quinoline solubles is measured by capturing completely the fine particles according to the following method.

About one gram of a composite of the mesophase-containing pitch and carbon black pulverized by a vibrating mill to about 100 mesh or less (the existing ratio of the two is calculated from the weight balance before and after the heat treatment reaction) is accurately measured and placed in a 50 ml Erlenmeyer flask provided with a ground stopper, and 30 ml of warm quinoline is added thereto, after which the flask is stoppered, and the quinoline solubles are dissolved by subjecting them to ultrasonic vibration at 80° C. for 30 minutes. A glass fiber filter with permeation particle size of 2.7 μm previously made to constant weight is mounted on a three-piece filter funnel produced by Whatman Co., the whole funnel being maintained at about 80° C., and slurry in which quinoline dissolution has been completed is poured thereto. The quinoline solubles are separated by filtration under reduced pressure by a water jet pump. Then, the residue on the filter paper is washed three times with 30 ml of warm quinoline, washed twice with 30 ml of acetone, and dried in an air stream, and the filter paper is dried to constant weight at 150° C. in a vacuum drier to determine the residual amount. From the amount of the mesophase-containing pitch contained in 1 g of the composite, the content of quinoline solubles (wt. %) is calculated.

(3) The step of molding carbonaceous precursors

The composite obtained by the process of the present invention can be formed into a green molding according to pressure molding. The molding temperature can be selected as desired from room temperature to a temperature at which the mesophase-containing pitch will not undergo decomposition. Generally speaking, when a porous molding is desired, molding can be carried out at a temperature lower than the softening point of the mesophase-containing pitch. When a dense molding is desired, molding can be carried out at a temperature from the softening point to 400° C. (substantially 200° to 400° C.).

(4) The step of carbonization/graphitization of the molding

The green molding obtained according to the process of the present invention can be subjected to carbonization and graphitization reaction in an inert atmosphere at a temperature elevation speed of 1° to 1,500° C./hour, preferably 10° to 800° C./hour, more preferably 50° to 500° C./hour. A large scale plate can be subjected to the carbonization reaction by placing it on a carbonaceous plate or between carbonaceous plates, whereby deformation by its own weight can be prevented. The carbonization temperature employed is 700° C. or higher, preferably 800° C. or higher, to produce a desired carbonic composite molding. The graphitization reaction is practiced, in an inert atmosphere, at a temperature elevation speed of 150° to 3,000° C./hour up to about 3,000° C. depending on the purpose.

The unique features of the process (II) of the present invention are as described below.

The process (I) for obtaining a graphitic molding endowed with high electroconductivity, high strength and resistance to hot phosphoric acid, which is substantially free from volume shrinkage or deformation during carbonization, by pressure molding of mixed powder of a mesophase-containing pitch and graphite can be considered to have established the technique of suppressing markedly shrinkage during carbonization commonly known in carbon industries of the prior art, but it involves many superfluous aspects for a production process. More specifically, as described in detail in the Examples set forth below, for obtaining the starting powder of the molding, long steps of (1) preparation of modified tar→(2) production of modified pitch by distillation→(3) production of mesophase-containing pitch by heat treatment→(4) grinding and mixing with graphite are generally required.

By the application of the present invention for this process, the number of steps can be markedly simplified as (1) preparation of modified tar→(2) production of the starting powder by heat treatment of the slurry of the modified tar and the graphite powder. With a content of the mesophase-containing pitch within the range of from 5 to 50 parts by weight, preferably from 10 to 40 parts by weight, per 100 parts by weight of the graphite powder, no mutual fusion phenomenon occurs between the particles of the composite powder of graphite and mesophase-containing pitch, and therefore no pulverizing step whatsoever is required, whereby the powder can advantageously be charged as it is into a mold for pressure molding.

By applying the heating pressure molding method for the composite of the mesophase-containing pitch and various fillers, the molding can be markedly improved in denseness and strength.

Carbon black cannot be easily kneaded with coal tar pitch and it has heretofore been necessary to apply ample surface treatment on carbon black by provision of a pre-treatment step of carbon black when it is to be used in a special carbon article such as a carbon brush, etc. However, in the case of carbon black having the characteristics of large dibutyl phthalate absorption and surface area, and small tap density, no molding can be obtained unless a large amount of at least 5 parts by weight of coal tar pitch is kneaded with one part by weight of carbon black, with the result that the characteristics expected by addition of carbon black will disappear. As a consequence, in spite of its having desirable characteristics such as high electroconductivity, it has not been utilized as aggregate for carbon molding.

By the application of the process (II) of the present invention, even a bulky carbon black with an apparent specific gravity of 0.12 g/cc or less can produce a molding with homogeneous properties according to room temperature molding and heating molding by permitting 0.1 to 5 parts by weight of a mesophase-containing pitch to exist per 1 part by weight of the carbon black.

Also, surprisingly enough, it has been found that carbonization is possible without occurrence of deformation or cracks by the use of a bulky carbon black [e.g., highly electroconductive carbon blacks produced by Mitsubishi Yuka K.K.: HE-280P, HE320P, HE400P (trade names)] even when such a green molding is subjected to the carbonization reaction at a speed of 100° to 1,000° C./hour, which cannot be entirely expected from the techniques for production of carbon black molding of the prior art. Since the content of the mesophase-containing pitch is variable over a wide range, it has been rendered possible to design various moldings having various properties from porous to dense properties. Also, as to the flexural strength of the molding, a product molded at room temperature and carbonized at 1,000° C. can exhibit a strength of 880 kg/cm$^2$. Thus, it has been found that a high-strength product can easily be produced.

The process (II) of the present invention is also applicable for making a composite with silica alumina, γ-alumina, α-alumina, silicon carbide, silicon nitride, boron nitride, etc. That is, such a composite preparation corresponds to the case when these inorganic compounds or metal compounds are selected as the filler in the above step (1). For example, an inorganic-carbon molding of high strength and high hardness can be obtained by permitting 10 to 50 parts by weight of a mesophase-containing pitch to be precipitated per 100 parts by weight of fine powdery silica alumina or γ-alumina, pressure molding the resultant mixture, and then subjecting the molding to carbonization.

By adding 30 to 100 parts by weight of a mesophase-containing pitch per 100 parts by weight of silicon carbide shaped into whiskers and calcining at 1,000° to 2,000° C., a high-strength carbon-inorganic composite can be obtained.

In the process (II) of the present invention, since a molding can be obtained even when the amount of the mesophase pitch as the binder for these inorganic compounds may be small, deformation in the carbonization can be small, and therefore it is possible to use a relatively great temperature elevation speed.

The process (II) of the present invention is also effective for a composite with metal powder. By further incorporating graphite into the mesophase-containing pitch-carbon black system as described above, a molding having high electroconductivity can be obtained even by low-temperature carbonization. On the other hand, for the materials such as a carbon slider shoe for pantographs for which high strength and abrasion resistance as well as high electroconductivity are demanded, a measure in the prior art has been to lower the resistivity of the slider shoe by incorporation of a metal such as copper or tin in place of graphite which is susceptible to abrasion.

According to the process (II) of the present invention, in which mesophase-containing pitch is precipitated on a mixture of carbon black with fine copper powder with appropriate particle sizes, a composite containing carbon black, copper powder and mesophase-containing pitch dispersed uniformly therein can be obtained, from which a molding having both high strength and high electroconductivity can be obtained by carbonization at 1,000° to 1,500° C.

Also, by application of the process (II) of the present invention, it is also possible to make a composite of plated carbon with mesophase-containing pitch. For example, after plating carbon black with copper or nickel, a mesophase-containing pitch can be precipitated thereon to produce a molding in which high electroconductivity is imparted to carbon black itself. Further, by precipitation of a mesophase-containing pitch on a mixture of plated carbon with fine copper powder, it is possible to obtain a molding in which both the aggregate and the matrix portion have electroconductivity. Also, according to the method in which a mesophase-containing pitch is precipitated on the powder carrying a metal compound such as copper chloride on carbon black, a carbon molding of dramatically improved electroconductivity can be obtained.

When a metal is dispersed into the molding according to the process (II) of the present invention, the effect of improvement of electroconductivity can be recognized by addition of a relatively smaller amount of metal as compared with the post-impregnation method of molten metal into the molding of the prior art.

The meritorious effects of the present invention may be summarized as follows.

(1) The production process is simplified as compared with the method of grinding and mixing mesophase pitch.

Also, the process is simplified with omission of cumbersome steps after heat treatment, as compared with the technique of the prior art.

(2) Since a mesophase-containing pitch containing quinoline solubles is employed, it has excellent caking characteristic and also has heating meltability, and therefore broad molding conditions from room temperature molding to heating molding can be employed.

Furthermore, the properties of molding can be varied widely.

(3) A carbon composite molding with an inorganic compound can be made.

(4) A metal component can easily be incorporated into the composite.

(5) A new molding with the function of a bulky material can be prepared.

The Process (III) for Production of Graphitic Molding

The process (II) as described above is shortened in steps as compared with the process (I) and also can give a graphitic molding having the characteristics of high electroconductivity and small shrinkage during carbonization similarly as the product obtained in the process (I) by the use of an appropriate graphite powder as the filler and selection of a pitch quantity with appropriate ratio relative to the graphite. However, according to this process, it is necessary to control the quinoline solubles in the mesophase-containing pitch at 5 to 90%, preferably 20 to 70%. In order to satisfy this condition, it is necessary in most cases to modify previously the mesophase precursors such as the naphtha-cracked residue, etc. by hydrogen treatment, etc. Thus, room for further shortening of the steps still remains in this process.

Still another object of the present invention is to provide a process (III) for production of a graphitic molding of high strength, high speed carbonizability, dimensional stability and high electroconductivity according to a more simplified process from graphite powder and a tar containing mesophase precursors.

We have made extensive studies to accomplish this object and, as a result, have found that the graphite-mesophase pitch mixed powder obtained by subjecting graphite powder and a tar containing mesophase precursors to heat treatment with blowing in of an inert gas or under reduced pressure according to the process (II) is free from generation of cracks as seen in the case of other carbon precursors even when pressure molding is carried out at 400° to 800° C. to produce a dense carbon molding. Also, when employing such a molding temperature, it is not necessary to limit the quinoline solubles in the mesophase pitch to 5 to 90%. It has also been found that a graphitic molding with excellent properties can be produced even in the case of quinoline solubles of a quantity less than 5%. For this reason, a broader scope of starting materials and reaction conditions became available to enable further simplification of the steps. For example, when employing the naphtha-cracked residue as the starting material, it has been desired in the prior art process to modify it previously by hydrogen treatment, but no such modification is necessary, and it has also become possible to carry out heat treatment under a broader scope of conditions.

The process (III) comprises the following steps.

(1) The step of suspending graphite powder in a tar:

Concerning the graphite powder and tar in this step, the same description as in the step (1) in the process (II) is applicable.

The amount of the tar relative to the graphite powder differs depending on the composition of the tar and is so selected that the amount of the mesophase pitch formed on the graphite powder will be 3 to 3,000 parts by weight based on 100 parts by weight of the graphite. However, when it is desired to maintain the volume shrinkage at a small value, 3 to 50 parts by weight, preferably 5 to 40 parts by weight is selected.

(2) The step of forming mesophase on the material surface:

By heat treatment of a slurry comprising the graphite powder and the tar at 350° to 550° C., preferably 400° to 500° C., mesophase pitch is formed on the graphite surface. During this operation, the slurry temperature is elevated up to the reaction temperature in a stream of an inert gas such as nitrogen gas, carbon dioxide, or argon, or under reduced pressure of, for example, 10 to 100 mmHg, maintained for a specific period of time, and thereafter the slurry is cooled to obtain a composite of graphite and mesophase pitch.

Since strict control of the quinoline solubles in the mesophase pitch is not required, a broad scope of conditions can be employed, and also blowing in of a compound capable of supplying hydrogen can be omitted. Even in such a case, the light distillates in the tar can be evaporated, because heat treatment is carried out in an inert gas stream or under reduced pressure, whereby only the mesophase precursors with relatively uniform compositions can be converted into mesophases, and the mesophases formed are relatively homogeneous, have increased caking property, and have high carbonization yield. The quantity of the quinoline solubles in the mesophase pitch, which differs depending on the starting material and the heat treatment conditions, is generally 0 to 50%. The content of quinoline solubles was measured according to the JIS-K-2425 centrifugal method.

When the heat treatment temperature is lower than 350° C., it will take a long time for mesophase formation, while at a temperature higher than 550° C., the caking components will undesirably be markedly reduced.

(3) The step of molding carbonaceous precursors:

The composite of the graphite and the mesophase pitch obtained by the heat treatment contains less than 5% of insolubles in the mesophase depending on the kind of the mesophase precursors and the heat treatment conditions. In this case, at a molding temperature lower than 400° C., there has been a problem in that no dense carbon molding can be obtained. In contrast, by carrying out pressure molding at a temperature of 400° to 800° C., a dense carbon composite can be obtained even from such a composite. Hitherto, it has been accepted that no satisfactory molding can be obtained at 500° C. or higher or 600° C. or higher with formation of cracks [Pretext for 11th Annual Meeting of Carbon Society of Japan, p. 146 (1984)]. In contrast, in the case of the graphite-mesophase pitch of the present invention, a dense carbon product can be obtained without generation of cracks, which is indicative of the unique feature of the starting composite of the present invention.

Also, when the mesophase pitch ratio in the graphite-mesophase pitch composite is high, in molding at a temperature lower than 400° C., there arises a problem in that swelling is generated in the subsequent carbonization step to produce an unsatisfactory molding. In contrast, in molding at a temperature over 400° C., more preferably 550° C. or higher, this problem can also be overcome.

Further, even in the case when a dense molding can be obtained by molding at a temperature lower than 400° C., a carbon molding with better performance can be obtained by increasing the molding temperature. A molding temperature higher than 800° C. is not suitable because it is difficult to use a mold of a metal, and a special device is required.

Pressure molding can be performed in a conventional manner. The pressure is preferably within the range of from 10 to 3,000 kg/cm$^2$ (gauge), more preferably from 100 to 2,000 kg/cm$^2$. When a mold with larger coefficient of thermal expansion than the molding, such as a mold made of stainless steel, is employed, it is desirable to resort to some measure to release the stress, such as controlling the dimensions at the peripheral portion of the mold, for prevention of crack generation by the stress during cooling.

(4) The step of carbonization/graphitization of molding:

The green molding obtained according to the process (III) of the present invention can be heated in an inert atmosphere at a heat elevation speed of 1° to 1,500° C./hour, preferably 10° to 800° C./hour, more preferably 50° to 500° C./hour, up to 800° C. or higher, preferably 900° C. or higher to be converted into a graphite-carbon type composite molding. Further, if necessary, it can be graphitized by heating at a temperature elevation speed of 150° to 3,000° C./hour up to about 3,000° C.

The characteristic features of the process (III) of the present invention are as described below.

According to the process (III) of the present invention, (1) a carbon molding of improved characteristics without formation of cracks even at the temperature at which cracks are believed to be formed in moldings of other carbon precursors; (2) since it is not necessary to provide restriction with respect to the quinoline solubles in the mesophase pitch, it becomes possible to employ a broad scope of starting materials and preparation conditions, and the steps can be shortened with omission of the pre-treatment of the tar; and (3) even in the case of a high ratio of mesophase pitch, no swelling occurs during carbonization to produce a dense molding.

The graphitic molding obtained by the process (III) of the present invention can be used for various uses, typically a gas separator for fuel cell, and otherwise various bipolar plates, graphite electrode for electrolysis, graphite crucible and boat, implements for preparation of semiconductors, etc.

Process (IV) for Production of Graphitic Molding

The above process (III) removes the problems involved in the processes (I) and (II) and enables use of broad scope of mesophase pitch and heat treatment conditions. However, it still requires four steps, and it would be desirable to further shorten the steps and improve performance of the molding obtained.

Still another object of the present invention is to provide a process (IV) for producing a graphitic molding of high strength, high speed carbonization, dimensional stability and high electroconductivity from graphite powder and a tar containing mesophase precursors according to a more simplified process.

We have made extensive studies to accomplish this object and consequently found that the graphite-mesophase pitch mixed powder obtained by the process (III) from graphite powder and a tar containing mesophase precursors requires no preliminary calcination and can produce a graphitic molding of high strength and denseness without generation of crack by pressure molding (hot press) directly at 800° C. or higher. The molding obtained according to the process (IV) of the present invention has strength and electroconductivity which are at least equal to that obtained by the process (III) and has, additionally, an excellent characteristic with respect to gas impermeability. Further, since no crack is formed even when the article is molded with the use of a molding material having unevenness on the surface, it is possible to make a molding with a complicated shape.

The process (IV) comprises the following steps (1), (2), and (3).

(1) The step of suspending graphite powder in a tar:

Concerning the graphite powder and the tar, the same description as in the step (1) in the process (II) and (III) is applicable.

The amount of the tar relative to the graphite powder differs depending on the composition of the tar and is so selected that the amount of the mesophase pitch formed on the graphite powder will be 3 to 150 parts by weight, preferably 5 to 50 parts by weight, based on 100 parts by weight of the graphite powder.

(2) The step of forming mesophase on the material surface:

Concerning the step of obtaining a composite of graphite and mesophase pitch from a slurry comprising graphite powder and tar, the same description in the step (2) of the process (III) is applicable.

Since the heat treatment is carried out in an inert gas stream or under reduced pressure, the light distillates in the tar can be evaporated, whereby only mesophase precursors with relatively uniform compositions can be converted to mesophase, and the mesophase formed will be relatively homogeneous, enriched in caking property and also will have high carbonization yield. If heat treatment is conducted while hydrogen donating compound is supplied, a more homogeneous mesophase can be obtained, but such operation is not necessarily required. A suitable quantity of the quinoline solubles in the mesophase pitch is 40% or less.

When the heat treatment temperature is lower than 350° C., the mesophase formation will take a long time, while at a temperature higher than 550° C., the caking components will undesirably be markedly reduced.

(3) The step of molding of carbonaceous precursors:

The composite of graphite and mesophase pitch obtained by the heat treatment, after pulverization, can be subjected to hot press molding with the use of a mold made of graphite under a vacuum or in an inert gas atmosphere at 800° C. or higher temperature, preferably 900° C. or higher, to obtain a graphitic molding. Other carbon precursors could not be hot pressed in the prior art, but a means for preliminary calcination has been employed (Pretext for 11th Annual Meeting of Carbon Society of Japan, p.146, 1984). In contrast, in the case of the graphite-mesophase pitch composite of the present invention, no preliminary calcination is required and yet direct hot press molding is possible without formation of crack not only in the case with a flat press surface, but also in the case having unevenness, and also without causing fusion. This is an important feature of the present invention.

The molding obtained has excellent strength and electroconductivity, and also has the characteristic feature of gas impermeability. These characteristics can be attained by molding at 800° to 1,500° C. Further, depending on the characteristics required, a temperature of up to 3,000° C. can be employed. The speed of temperature elevation to a desired temperature can be 150° to 3,000° C./hour, and the pressure can be within the range of from 50 to 2,000 kg/cm$^2$.

The significant advantages of the process (IV) of the present invention are as described below.

According to the process (IV) of the present invention, (1) a molding with a complicated shape can be obtained directly by hot press molding without the necessity of preliminary calcination, and also (2) the molding obtained has excellent strength and electroconductivity and also has the unique feature of gas impermeability.

The graphitic molding obtained by the process (IV) of the present invention can be used for various uses, typically a gas separator for a fuel cell, and otherwise various bipolar plates, graphite electrode for electrolysis, graphite crucible and boat, implements for preparation of semiconductors, etc.

The present invention is described in more detail in the following Examples and Comparative examples. These Examples are merely illustrative of the present invention.

EXAMPLE I-1

Preparation of mesophase-containing pitch

Into an autoclave of 1-liter inner volume were charged 630 g of a naphtha-cracked residual tar formed by thermal cracking of naphtha (b.p. 170° C. or higher, calculated under normal pressure) and 30 g of a silicaalumina catalyst for fluidized catalytic cracking (produced by Shokubai Kasei K.K., containing 13 wt. % of alumina, powder). Hydrogen was passed through the autoclave at 100 liter/hour (STP), and the temperature was elevated from room temperature to 460° C. over 140 minutes, while the reaction pressure was maintained at 120 kg/cm$^2$ (gauge) and maintained at that temperature for 80 minutes. After cooling to room temperature, the contents were taken out, and the solids were filtered off, which step was followed by removal of the distillates of 490° C. or lower calculated under normal pressure by distillation, to obtain a hydrogen-treated naphtha-cracked residual tar with a yield of 25 wt. % based on the starting material charged.

The modified pitch (10 g) as prepared above was charged into a reactor which was equipped with an inner cylinder of an inner volume of 40 ml and prevented from reflux of the distillate into the pitch and was maintained for 10 minutes while argon at 350 liter/min. and 1,2,3,4-tetrahydroquinoline in a liquid state at 0.13 g/min. were supplied onto the pitch. Then the reactor was immersed into a molten salt bath maintained previously at 485° C. After melting of the pitch, while argon and tetrahydroquinoline were charged into the liquid pitch, heat treatment was conducted at a reaction temperature of 483° C. for 13 minutes.

As a result, a mesophase-containing pitch was obtained with a yield of 52 wt. % based on the modified pitch. The pitch obtained was embedded in an epoxy resin and polished, and the resultant sample was subjected to observation by a polarized light microscope at room temperature for measurement of the ratio of optical anisotropy, that is, the mesophase content. As a result, the mesophase content of the pitch was found to be substantially 100%. On the other hand, the content of the fraction insoluble in quinoline (by the centrifugal method according to JIS 2425) in this sample was found to be 45 wt. %.

The melting temperature of the mesophase containing pitch was measured by an optical microscope equipped with a hot stage and found to be 300° C. The weight reduction was determined by heating 10 mg of the pitch in a differential thermogravimetric device to 1,000° C. in a nitrogen gas atmosphere to obtain a carbonization yield of 85 wt. %.

Preparation of graphitic molding

The mesophase-containing pitch (1.34 g) pulverized to 100 mesh or less was mixed with 8.00 g of flake type graphite powder produced by Nippon Kokuen Kogyo K.K. (trade name: CPB). The resultant mixture was charged into a sample chamber for a vibrating sample mill produced by Hirako Seisakusho and mixed with grinding for 2 hours. The mixed powder thus obtained (1.70 g) was charged into a mold made of stainless steel of 63.5 mm in length and 12.7 mm in width, preliminarily molded at room temperature by application of a pressure of 1.5 TON/cm$^2$ (gauge) in a pressing machine, then elevated in temperature to 340° C. under the pressurized state and maintained thereat for one hour. After the mold was left to cool to 200° C., the applied pressure was reduced to atmospheric pressure, and the outer frame of the mold was opened to prevent generation of stress cracking which may be caused by the difference in thermal shrinkage between the graphite and the mesophase-containing pitch and the stainless steel. Then, cooling was carried out to room temperature to produce a green molding. The green molding obtained was heated in an argon gas stream at a speed of 5° C./min. up to 1,000° C., maintained thereat for 30 minutes, and thereafter cooled to room temperature to obtain a graphitic molding with a smooth surface of 63.6 mm in length, 12.8 mm in width and 1.0 mm in thickness. This molding had the characteristic values of a weight of 1.67 g, an apparent bulk density of 2.1 g/cm$^2$, a volume shrinkage of 0.6%, a weight reduction based on the green molding of 1.7%, and a specific resistivity in the plate length direction according to the four terminal method of 1.2 m$\Omega$·cm.

The average flexural strength as measured by the three-point flexural test of the four sheets of the graphite moldings obtained by the same method was found to be 550 kg/cm$^2$.

This graphite molding was immersed into 100% phosphoric acid controlled at a liquid temperature of 200° C. ±1° C. and the dimensions before and after immersion for 500 hours were measured, whereupon no change whatsoever was observed. Also, the phosphoric acid adhering to the surface of the graphite molding after the 500 hours of treatment was wiped off with a filter paper, and the molding was subjected quickly to measurement of its weight. As a result, the amount of the phosphoric acid was determined to be 5.6 wt. %. Further, the graphite molding was washed with a large amount of water, dried at 100° C. under reduced pressure, and thereafter its weight was measured, whereupon the residual phosphoric acid content was found to be 4.5 wt. %. For comparison, the GC composite produced by Kobe Seikosho K.K. was treated under the same conditions, and the amount of phosphoric acid absorbed after the treatment was found to be 6.4 wt. %, and the residual phosphoric acid content was found to be 5.1 wt. %, with no change in constitution being observable.

EXAMPLE I-2

The lower press stand of Example I-1 was changed so as to form two columns with an outer diameter of 4 mm and a depth of 2.5 mm at the central portion of a hollow cylinder with an outer diameter of 12 mm. 8.3 g of the mixed powder of the flake type natural graphite and the mesophase-containing pitch obtained with the same compositional ratio and according to the same procedure was charged into the mold. Following the same molding operation as in Example I-1, a green molding with a complicated shape of 63.9-mm length, 12.9-mm width and 5.5-mm thickness was obtained and then subjected to the carbonization treatment under the same conditions as in Example I-1 to obtain a graphitic molding. The volume shrinkage of the graphitic molding was found to be 0.5% and its weight reduction 1.8%. When the uneven portion was fitted into the press stand having an unevenness, it was placed in position with neither excess nor shortage.

EXAMPLE I-3

A graphitic molding was prepared according to the same method as in Example I-1 except for the use of an artificial graphite KS-2.5 produced by LONZA Co. Various characteristic values are summarized in Table I-1.

EXAMPLE I-4

A graphitic molding was prepared according to the same method as in Example I-1 except for the use of an artificial graphite produced by Nippon Carbon K.K. (GA-5, non-self-moldable). Various characteristic values are summarized in Table I-1.

COMPARATIVE EXAMPLE I-1

A graphitic molding was prepared according to the same method as in Example I-1 except for the use of a medium temperature coal tar pitch as the binder. Various characteristic values are summarized in Table I-1.

COMPARATIVE EXAMPLE I-2

The flake type graphite powder employed in Example I-1 was charged into the mold of Example I-1, and a pressure of 1.5 TON/cm$^2$ was applied at room temperature to obtain a green molding, which was then formed into a graphitic molding by heating up to 1,000° C. similarly as in Example I-1. Various characteristic values are summarized in Table I-1.

EXAMPLE I-5

The same mixed powder (1.7 g) obtained with the same composition and according to the same preparation method as in Example I-1 was placed in the mold, and a pressure of 1.5 TON/cm$^2$ was applied at room temperature to obtain a green molding, which was carbonized similarly as in Example I-1 to obtain a graphitic molding. Various characteristic values are summarized in Table I-1.

TABLE I-1

| | | Characteristic Values of Graphitic Moldings | | | | | | |
| | | Example | | | | | Comparative Example | |
| | | I-1 | I-2 | I-3 | I-4 | I-5 | I-1 | I-2 |
| Carbonization | Volume shrinkage | 0.6 | 0.5 | −3.0 | 2.3 | 0.7 | 0.1 | −0.2 |

TABLE I-1-continued

Characteristic Values of Graphitic Moldings

| | | Example I-1 | Example I-2 | Example I-3 | Example I-4 | Example I-5 | Comparative Example I-1 | Comparative Example I-2 |
|---|---|---|---|---|---|---|---|---|
| | (%) | | | | | | | |
| | Weight reduction (%) | 1.7 | 1.8 | 1.8 | 2.0 | 2.6 | 7.3 | 0.6 |
| Graphitic molding | Apparent density (g/cc) | 2.10 | 2.05 | 1.79 | 1.78 | 1.89 | 1.95 | 2.11 |
| | Resistivity (MΩ · cm) | 1.2 | 1.1 columnar portion | 2.0 | 4.9 | 3.0 | 2.0 | 0.6 |
| | Flexural strength (kg/cm$^2$) | 550 | — | 400 | 296 | 240 | 230 | 60 |
| Test of resistance to phosphoric acid under heat | Volume expansion (%) | 0 | 0 | 0 | 0 | 0 | 0.2 | 5.5 |
| | Phosphoric acid absorption (%) | 5.6 | 5.9 | 7.1 | 8.0 | 6.1 | 23.2 | 9.8 |
| | Residual phosphoric acid (%) | 4.5 | 4.4 | 3.3 | 4.0 | 0.8 | −1.4 | −0.8 |

The molding thickness was 1 mm (except for Example I-2).

EXAMPLE II-1

Into an autoclave of 1-liter inner volume were charged 629 g of a naphtha-cracked residual tar formed by thermal cracking of naphtha (b.p. 170° C. or higher, calculated under normal pressure) and 30 g of a silica-alumina catalyst for fluidized catalytic cracking (produced by Shokubai Kasei K.K., containing 13 wt. % of alumina, powder). Hydrogen was passed through the autoclave at 100 liters/hour (STP), and the temperature was elevated from room temperature to 460° C. over 140 minutes, while the reaction pressure was maintained at 120 kg/cm$^2$ (gauge), and maintained at that temperature for 80 minutes. After cooling to room temperature, the contents were taken out and the solids were filtered off, which step was followed by removal of the distillates of 490° C. or lower calculated under atmospheric pressure by distillation to obtain 455 g of a modified naphtha-cracked residual tar.

A flake type graphite (30.0 g, produced by Nippon Kokuen Kogyo K.K., trade name CPB) dried by degassing in a vacuum drier at 150° C. for 2 hours was charged into a reactor which was equipped with an inner cylinder of an inner volume of 250 ml and means for preventing reflux of the distillate into the pitch. Further, 28.9 g of the above modified tar and 29.9 g of quinoline (First grade reagent) were added to form a slurry. While argon at 1.75 liter/min. (STP) and 1,2,3,4-tetrahydro-quinoline in gaseous state were supplied at 0.75 g/min, through the bottom of the inner cylinder, the reactor was immersed into a molten salt bath maintained previously at 493° C. After 11 minutes, a reaction temperature of 483° C. was obtained and maintained for 11 minutes. Thereafter, cooling was carried out to room temperature to obtain a mixed powder of natural graphite containing 16.4 wt. % of the mesophase-containing pitch. The content of the fraction insoluble in quinoline as determined by the centrifugal method according to JIS 2425 in the mixed powder was found to be 22.8 wt. %.

The mixed powder (1.70 g) was placed in a mold made of stainless steel of 63.5-mm length and 12.7-mm width, preliminarily molded at room temperature by application of a pressure of 1.5 TON/cm$^2$ (gauge) by a pressing machine, then heated to a temperature of 340° C. under the pressurized state and maintained thereat for 5 minutes. After the mold was left to cool to 200° C., the applied pressure was reduced to atmospheric pressure. The outer frame of the mold was opened to prevent generation of stress cracking which may be generated through the difference in thermal shrinkage between the graphite and the mesophase-containing pitch and stainless steel. Cooling to room temperature was carried out to obtain a green molding.

The green molding thus obtained was heated in an argon gas stream at a heating rate of 5° C./min. up to 1,000° C., maintained thereat for 30 minutes and thereafter cooled to room temperature to obtain a graphitic molding with a smooth surface of 63.6-mm length, 12.9-mm width and 1.0-mm thickness. This molding had the characteristic values of 1.61-g weight, 1.84-g/cm$^2$ apparent bulk density, 0.3% volume shrinkage, 1.5% weight reduction based on the green molding, and 1.3 mΩ·cm specific resistivity in the plate length direction according to the four terminal method.

The average flexural strength as measured by the three-point flexural test of the four sheets of the graphite moldings obtained by the same method was found to be 480 kg/cm$^2$.

The green molding obtained according to the method at any desired portion was embedded in an epoxy resin and polished, and the resultant sample was observed by a polarized light microscope to confirm that no site in which the mesophase moiety existed as a large mass was found.

EXAMPLE II-2

The modified tar of Example II-1 (59.9 g) and 5.0 g of a highly electroconductive carbon black (produced by Mitsubishi Yuka K.K.; trade name: HE-320; dibutylphthalate absorption (according to JISK-6221): 320 ml/100 g; N$_2$ adsorption surface area: 700 m$^2$/g; volatiles: 1.0% ash: 0.2%; particle size: 40 mu; apparent specific gravity: 0.12 g/cc) were charged into the autoclave of Example II-1 to form a slurry.

While argon and 1,2,3,4-tetrahydroquinoline (in amounts as indicated in Example II-1) were supplied through the bottom of the inner cylinder, the reactor was immersed in a molten salt bath maintained previously at 495° C. After 22 minutes, the reaction temperature reached 478° C., which was maintained for 11 minutes and then cooled to room temperature to obtain 13.9 g of a mixed mass of carbon black and a mesophase-containing pitch containing 64.2 wt. % of the mesophase-containing pitch. The mixed mass was charged into a sample chamber for a vibrating sample mill produced by Hirako Seisakusho, and ground for 5 minutes to obtain a mixed powder.

One gram of the above mixed powder was accurately weighed and charged into a 50 ml Erlenmeyer's flask with a ground stopper. 30 ml of warm quinoline was poured thereinto, and the fraction soluble in quinoline was dissolved by shaking at 80° C. for 30 minutes by means of an ultrasonic shaker. The mixture was poured into a Whatman 3-piece filter funnel having a glass fiber filter paper produced by the Whatman Co. (grade GF/D) previously made to a constant weight thereon and filtered under reduced pressure by a water jet pump. Subsequently, the residue was washed three times with 30 ml of warm quinoline and, after cooling, twice with 30 ml of acetone. Then drying was carried out in an air stream. The residue and the filter paper were dried in a vacuum drier at 150° C. for one hour to a constant value to obtain 51.6 wt. % of the fraction soluble in quinoline of the mesophase-containing pitch.

When a part of the mixed mass was observed through a polarized light microscope, a uniform distribution of mesophases was observed.

The mixed powder (1.0 g) was charged into the mold of Example II-1, and a pressure of 1.5 TON/cm$^2$ was applied by a pressing machine to obtain a green molding, which was then heated at a rate of 5° C./min. in an argon gas stream up to 1,000° C., maintained thereat for 30 minutes, and then cooled to room temperature to obtain a carbonaceous molding without swelling or distortion. This mold had the dimensions of 62.0-mm length, 1.26-mm width and 1.1-mm thickness, and characteristic values of 0.93-g weight, 1.12-g/cm$^3$ apparent bulk density, 1.62% volume shrinkage and 7.17% weight reduction based on the green molding, and 16.8-mΩ·cm specific resistivity in the plate length direction as measured by the four terminal method.

The average flexural strength of the two sheets of the carbonaceous moldings obtained according to the same method as measured by the three-point flexural test was found to be 314 kg/cm$^2$.

EXAMPLE II-3

According to the same procedure as in Example II-2, 2.0 g of carbon black and 47.9 g of the modified tar were subjected to heat treatment at 480° C. for 11 minutes to obtain 9.8 g of a composite of carbon black and a mesophase-containing pitch containing 79.7 wt. % of the mesophase-containing pitch (quinoline solubles: 33.2 wt. %). The powder obtained by pulvertization according to the method of Example II-2 (1.0 g) was molded and carbonized following the same procedures as in Example II-2, to obtain a molding of 56.7 mm in length, 11.5 mm in width and 0.96 mm in thickness, having characteristic values of 1.44 g/cm$^2$ of apparent bulk density, 24% of volume shrinkage and 9.8% of weight reduction based on the green molding, and a specific resistivity of 9.1mΩ·cm, with its average flexural strength being 700 kg/cm$^2$.

EXAMPLE II-4

The mesophase-containing pitch-carbon black mixed powder of Example II-2 (3.4 g) was charged into the mold of Example II-1, and molded preliminarily by application of a pressure of 1.5 TON/cm$^2$ by a pressing machine. Then, the mold was heated up to 280° C., maintained thereat for one minute, and thereafter the applied pressure was made zero and the outer frame of the mold was released to prevent generation of stress cracking of the molding, followed by cooling to room temperature to obtain a green molding. Except for changing the temperature elevation speed to 2.5° C./min., the green molding was provided for the carbonization reaction under the same conditions as in Example II-2 to obtain a carbonaceous molding of 60.4 mm in length, 12.2 mm in width and 3.3 mm in thickness, having characteristic values of 1.32 g/cm$^3$ of apparent density and 11.1 mΩ·cm of specific resistivity.

The three-point flexural strength of the two sheets of the carbonaceous molding obtained according to the same method was found to be 555 kg/cm$^2$.

EXAMPLE II-5

The modified tar of Example II-1 (7.5 g) and 2.5 g of SiC whisker (Tokamax) produced by Tokai Carbon K.K. were subjected to heat treatment by use of the same reactor and the same reaction conditions as in Example II-1 to obtain 3.6 g of mixed granular material containing 31.4 wt. % of a mesophase-containing pitch. The content of quinoline solubles as determined by the method of Example II-1 was found to be 55.3 wt. %. The mixed granular material was pulverized according to the method of Example II-2 and 3.56 of the resultant powder was charged into the mold of Example II-1, and molding and carbonization were conducted following the same procedures as in Example II-3, to obtain a molding of 63.4 mm in length, 12.8 mm in width and 2.2 mm in thickness, having the characteristic values of 1.92 g/cm$^3$ of apparent density and 700 kg/cm$^2$ of flexural strength.

EXAMPLE II-6

Into a 300 ml egg-plant type flask were charged 5 g of a highly electroconductive carbon black (HE-320 P) and 2.01 g of cupric chloride dihydrate, and 140 ml of methanol was added to dissolve cupric chloride, thereby forming a slurry. Then, methanol was evaporated by a rotary evaporator and further the slurry was dried in a vacuum drier at 100° C. for 2 hours. To 5.0 g of the resultant composition was added 59.7 g of the modified tar of Example II-1, and the heat treatment was carried out according to the procedure of Example II-1 to obtain 15.2 g of a mixed mass containing 67.1 wt. % of the mesophase-containing pitch and 45.2 wt. % of a quinoline soluble content of 45.2 wt. % as measured by the method of Example II-2. The mixed mass was pulverized, molded and carbonized according to the methods of Example II-2 to obtain a molding of 58.1 mm in length, 11.7 mm in width and 3.8 mm in thickness, having characteristics of 1.46 g/cm$^3$ of apparent density, 7.6 mΩ·cm of specific resistivity and 455 kg/cm$^2$ of flexural strength.

COMPARATIVE EXAMPLE II-1

The modified tar obtained according to the method of Example II-1 was distilled to remove the distillates of 490° C. or lower calculated under normal pressure to obtain a hydrogen-treated pitch with a yield of 25 wt. % based on the starting material charged. The modified pitch as prepared above (10 g) was charged into a reactor equipped with an inner cylinder of 40 ml inner volume and prevented from reflux of the distillates into the pitch and maintained for 10 minutes while supplying argon at 0.35 liter/min. and 1,2,3,4-tetrahydroquinoline under liquid state at 0.13 g/min., and thereafter the reactor was immersed in a molten salt bath maintained previously at 485° C. After melting of the pitch, while supplying argon and tetrahydroquinoline into the liquid pitch, heat treatment was carried out at a reaction temperature of 483° C. for 13 minutes.

A mesophase-containing pitch was obtained at a yield of 53 wt. % based on the hydrogen-treated pitch, with the quinoline soluble content being 53 wt. % and the mesophase content being substantially 100%.

A mixture of 1 g of the carbon black of Example II-2 and 5 g of the above mesophase-containing pitch was mixed by grinding in the vibrating mill of Example II-2, and 4 g of the resultant mixture was charged into the mold of Example II-1. After preliminary molding under 1.5 TON/cm$^2$ by means of a pressing machine, the mold temperature was elevated up to 340° C. under a pressure applied of 0.5 TON/cm$^2$ and maintained thereat for 5 minutes. Then, the mold was cooled to 200° C. and the pressure applied and the outer frame of mold were released, followed by cooling to room temperature. The green molding obtained was brittle, and a large number of sites were recognized where carbon black existed as small lumps, and the small lumps were readily dropped off by application of small external force.

EXAMPLE III-1

A flake type graphite (30.0 g, produced by Nippon Kokuen Kogyo K.K., trade name CPB) dried by degassing in a vacuum drier at 150° C. for 2 hours was charged into a reactor which was equipped with an inner cylinder of an inner volume of 250 ml and prevented from reflux of the distillate into the pitch, and further 39.6 g of a naphtha-cracked residual tar formed by thermal cracking of naphtha (b.p. of 170° C. or higher calculated under normal pressure) and 12.1 g of quinoline were added to form a slurry. While supplying argon at 1.75 liters/min. (STP) through the bottom of the inner cylinder, the reactor was immersed into a molten salt bath maintained previously at 455° C. After 18 minutes, the reaction temperature reached 450° C. and it was maintained thereat for 30 minutes, followed by cooling to room temperature, to obtain a mixed powder of natural graphite-mesophase-containing pitch containing 16.4 wt. % of the mesophase-containing pitch. The content of the quinoline insolubles of mesophase pitch as determined by the centrifugal method according to JIS 2425 in the mixed powder was found to be 96.0 wt. %.

The mixed powder (1.70 g) was filled into a mold made of SUS of 63.5 mm in length and 12.7 mm in width having a stress releasing mechanism, and elevated in temperature up to 420° C. and maintained thereat for 5 minutes while applying a pressure of 1.5 TON/cm$^2$ (gauge). After the mold was left to cool to 250° C., the pressure was released and the mold was cooled to room temperature to give a green molding. The green molding obtained was elevated in temperature in an argon gas stream at a speed of 5° C./min. up to 1,000° C., maintained thereat for 30 minutes and thereafter cooled to room temperature to obtain a graphitic molding with a flat surface of 63.9 mm in length, 12.9 mm in width and 1.1 mm in thickness, having the characteristic values of 0.7% of volume shrinkage, 1.2% of weight reduction based on the green molding, 0.8 mΩ·cm of specific resistivity in the plate length direction according to the four terminal method, and a flexural strength of 400 kg/cm$^2$.

EXAMPLE III-2

The natural graphite-mesophase pitch mixed powder (7.0 g) obtained similarly as in Example III-1 was filled in a mold made of SUS with a diameter of 50.1 to 50.3 mm and elevated in temperature up to 650° C. and maintained thereat for one minute while applying a pressure of 0.4 TON/cm$^2$ (gauge). After cooling to 500° C., the pressure was released and the mold was cooled to room temperature to obtain a green molding. The green molding was carbonized similarly as in Example III-1 to obtain a graphitic molding. The molding was found to have a diameter of 50.3 mm and a thickness of 17 mm with a smooth surface, and the characteristic values of 1.5% of volume shrinkage, 1.3% of weight reduction based on the green molding, 0.8 mΩ·cm of specific resistivity in the plate length direction according to the four terminal method, and a flexural strength of 400 kg/cm$^2$.

EXAMPLES III-3–III-5

In the same experiment as in Example III-2, the amount of the flake type graphite and the naphtha-cracked residual tar charged, and the heat treatment temperature and time were changed, following otherwise the same conditions, to obtain a graphite molding. The conditions and the results obtained are shown in Table III-1.

TABLE III-1

| | Example | III-3 | III-4 | III-5 |
|---|---|---|---|---|
| Amount charged | Graphite (g) | 25.0 | 23.6 | 7.0 |
| | Naphtha tar (g) | 62.8 | 75.7 | 103.8 |
| Heat treatment conditions | Temperature (°C.) | 473 | 473 | 483 |
| | Time (minute) | 15 | 15 | 10 |
| Properties of mixed powder | Pitch content (wt. %) | 20.0 | 24.3 | 57.4 |
| | Quinoline insolubles in pitch (wt. %) | 92.0 | 92.0 | 89.9 |
| Dimension of molding | Diameter (mm) | 50.1 | 50.0 | 48.4 |
| | Thickness (mm) | 1.7 | 1.8 | 1.3 |
| Properties of molding | Volume shrinkage (%) | 3.0 | 4.7 | 15.6 |
| | Weight reduction (%) | 1.0 | 1.3 | 2.4 |
| | Specific resistivity (mΩ · cm) | 1.0 | 1.0 | 2.5 |
| | Flexural strength (kg/cm$^2$) | 401 | 453 | 691 |

EXAMPLE IV-1

A flake type graphite (23.6 g, produced by Nippon Kokuen Kogyo K.K., trade name CPB) dried by degassing in a vacuum drier at 150° C. for 2 hours was charged into a reactor which was equipped with an inner cylinder of an inner volume of 250 ml and prevented from reflux of the distillate into the pitch, and further 75.7 g of a naphtha-cracked residual tar formed by thermal cracking of naphtha (b.p. of 170° C. or higher calculated under normal pressure) was added to form a slurry. While supplying argon at 1.7 liters/min. (STP) into the reactor through the bottom of the inner cylinder, the reactor was immersed into a molten salt bath maintained previously at 475° C. After 16 minutes, the reaction temperature reached 473° C. and it was maintained thereat for 15 minutes, followed by cooling to obtain a natural graphite-mesophase-containing pitch composite containing 16.4 wt. % of the mesophase-containing pitch. The content of the quinoline insolubles of mesophase-containing pitch as determined by the centrifugal method according to JIS-K 2425 in the composite was found to be 92.0%.

The composite (4 g) was pulverized and filled into a graphite mold of about 50 mm in inner diameter and elevated in temperature up to 1,100° C. over 105 minutes while applying a pressure of 0.4 TON/cm² (gauge) and maintained thereat for 5 minutes. After the mold was left to cool to 500° C., the pressure was released and the mold was cooled to room temperature to give a graphitic molding. The molding obtained was found to have a diameter of 50.2 mm, a thickness of 1.0 mm, a bulk density of 1.96, a specific resistivity of 0.8 mΩ·cm in the planar direction according to the four terminal method and a flexural strength of 588 kg/cm². When nitrogen pressure of 1 kg/cm² (gauge) was applied on said molding within the range of 8.6 cm² and gas permeation to the opposite side was observed by a soap film flowmeter. As the result, no gas permeation was recognized.

EXAMPLES IV-2–IV-5

In the same experiment as in Example IV-1, the heat treatment was conducted by changing the amounts of the flake type graphite and the naphtha-cracked residual tar charged, the heat treatment temperature and time, otherwise following the same procedure as in Example IV-1 to obtain graphite moldings. However, in Example IV-2, quinoline was added to the starting material charged for heat treatment, and in Example IV-2 and IV-3 the amount of the mixed powder charged into the graphite mold was made about 6 g. Also, in Example IV-5, the hot press temperature was changed to 1,050° C. The conditions and the results obtained are shown in Table IV-1.

EXAMPLES IV-6–IV-9

Into the graphite mold employed in Examples IV-1 to IV-5 at the bottom surface of the sample filling portion of the graphite mold, a graphite plate engraved with grooves with triangular cross-sections (1.5 mm bottom side, 1.5 mm height) at intervals of 1.5 mm was inserted, and about 8 g each of the graphite-mesophase pitch mixed powder obtained in Examples IV-1 to IV-5 was filled and subjected to hot molding under the same conditions. As the result, in each experiment, a graphite molding having projections with triangular cross-sections was obtained without formation of crack, and it could also be separated easily from the graphite plate.

What is claimed is:

1. A process for producing a carbonaceous or graphitic composite molding comprising a filler of at least one material in powder form selected from the group consisting of graphitic carbon, carbonaceous carbon, metals, metal compounds and other inorganic compounds qualified as a filler to a carbonaceous or graphitic molding derived from a mesophase-containing pitch, which comprises the four steps of:
   (1) suspending a filler comprising at least one material in powder form selected from the group consisting of graphitic carbon, carbonaceous carbon, metals, and metal compounds or other inorganic compounds qualified as a filler to a carbonaceous or graphitic molding in a tar containing a mesophase pitch precursor;
   (2) heating said suspension system to evaporate the light distillates contained in the tar by blowing of an inert gas into the suspension or by subjecting the suspension to a reduced pressure and subjecting said mesophase pitch precursor to heat treatment at 350° to 500° C. to obtain a carbonaceous precursor having a mesophase-containing pitch containing 30 to 80% by weight of quinoline insolubles, 40% or more of mesophase content, an upper limit of 400° C. and a carbonization yield at 1,000° C. of at least 70% by weight;
   (3) molding said carbonaceous precursor into a green molding containing mesophase-containing pitch; and
   (4) providing said green molding for carbonization or graphitization reaction in an inert atmosphere to form a carbonaceous or graphitic composite.

2. A process according to claim 1 wherein 5 to 1,000 parts by weight of the filler comprising said materials are used per 100 parts of the tar in the step (1).

3. A process according to claim 1 wherein the filler is selected from the group consisting of powders of graphite, carbon black, carbon black plated with metal, silica-alumina, γ-alumina, α-alumina, silicon carbide, silicon nitride, boron nitride, metals and mixtures thereof.

4. A process according to claim 1 wherein the carbonaceous filler in the step (1) is carbon black which is used in an amount of 10 to 500 parts by weight per 100 parts by weight of the mesophase-containing pitch.

5. A process according to claim 1 wherein heating is carried out at a temperature of 400° to 500° C. in the step (2).

6. A process according to claim 1 wherein the meso-

TABLE IV-1

|  | Example | IV-2 | IV-3 | IV-4 | IV-5 |
|---|---|---|---|---|---|
| Amount charged | Graphite (g) | 30.0 | 30.0 | 25.0 | 20.0 |
|  | Naphtha tar (g) | 39.7 | 48.4 | 62.8 | 86.3 |
|  | Quinoline (g) | 24.9 | 0 | 0 | 0 |
| Heat treatment conditions | Temperature (°C.) | 450 | 450 | 473 | 473 |
|  | Time (minute) | 15 | 15 | 15 | 15 |
| Properties of mixed powder | Pitch content (wt. %) | 10.6 | 13.6 | 20.0 | 30.3 |
|  | Quinoline insolubles in pitch (wt. %) | 86.0 | 86.0 | 92.0 | 92.0 |
| Dimension of molding | Diameter (mm) | 50.1 | 50.1 | 50.2 | 50.2 |
|  | Thickness (mm) | 1.4 | 1.5 | 1.0 | 1.0 |
| Properties of molding | Bulk density | 2.07 | 2.00 | 2.00 | 1.84 |
|  | Specific resistivity (mΩ · cm) | 0.7 | 0.7 | 0.7 | 1.1 |
|  | Flexural strength (kg/cm²) | 512 | 580 | 554 | 421 |
|  | Gas permeability | none | none | none | none | phase-containing pitch formed in the step (2) contains 20 to 70% by weight of quinoline solubles.

7. A process according to claim 1 wherein molding is carried out at a temperature not higher than the softening point of the mesophase-containing pitch in the step (3).

8. A process according to claim 1 wherein molding is carried out at a temperature higher than the softening point of the mesophase-containing pitch and up to 400° C. in the step (3).

9. A process according to claim 1 wherein carbonization or graphitization in the step (4) comprises heating said green molding in an inert atmosphere until carbonization or graphitization of the mesophase-containing pitch occurs.

10. A process according to claim 1 wherein the filler in the step (1) is a mixture of carbon black and copper powder, and the heating in the step (4) is carried out at 1,000° to 1,500° C. to produce a graphitic molding.

11. The process according to claim 1 in which the inorganic compound is selected from the group consisting of silica-alumina, alumina, silicon carbide and silicon nitride.

12. A process for producing a carbonaceous composite molding comprising graphitic carbon and a carbonaceous or graphitic material derived from a mesophase-containing pitch, which comprises the four steps of:
(1) suspending graphite powder in a tar containing a mesophase pitch precursor;
(2) heating the resulting suspension system at 350° to 550° C. while blowing an inert gas thereinto or subjecting said system to reduced pressure thereby to obtain a carbonaceous precursor having mesophase pitch formed on the surface of graphite particles;
(3) pressure molding said carbonaceous precursor at 400° to 800° C. into a green molding;
(4) carbonizing or graphitizing said green molding in an inert atmosphere; and
the mesophase-containing pitch having 30 to 80% by weight of quinoline insolubles, 40% or more of mesophase content, an upper limit of melting temperature of 400° C. and a carbonization yield at 1,000° C. of at least 70% by weight.

13. A process according to claim 12 wherein the amount of the tar relative to the graphite powder in the step (1) is so selected that the amount of the mesophase pitch formed on the graphite powder will be 3 to 3,000 parts by weight per 100 parts by weight of the graphite.

14. A process according to claim 13 wherein the amount of the tar relative to the graphite powder in the step (1) is so selected that the amount of the mesophase pitch formed on the graphite powder will be 3 to 50 parts by weight per 100 parts by weight of the graphite.

15. A process according to claim 12 wherein the heating in the step (2) is carried out at 400° to 500° C.

16. A process according to claim 12 wherein the content of the quinoline solubles in the mesophase pitch in the step (2) is 0 to 50%.

17. A process according to claim 12 wherein the heating in the step (3) is carried out at a temperature of 500° C. or higher.

18. A process according to claim 12 wherein the pressure molding in the step (3) is carried out under a pressure of 10 to 3,000 kg/cm$^2$ (gauge).

19. A process according to claim 12 wherein the step (4) comprises heating to a temperature of 800° C. or higher at a heat elevation speed of 1° to 1,500° C./hour.

20. A process according to claim 12 wherein the step (4) comprises heating to a temperature of 800° C. or higher at a heat elevation speed of 1° to 1,500° C./hour. and further to a temperature around 3,000° C. at a heat elevation speed of 150° to 3,000° C./hour.

21. A process for producing a carbonaceous composite molding comprising graphitic carbon and a carbonaceous or graphitic material derived from a mesophase pitch, which comprises the three steps of:
(1) suspending graphite powder in a tar containing a mesophase pitch precursor;
(2) heating the resulting suspension at 350° to 550° C. while blowing an inert gas thereinto or subjecting said suspension to a reduced pressure thereby to obtain a carbonaceous precursor having mesophase pitch formed on the graphite particles; and
(3) pressure molding said carbonaceous precursor at 800° to 3,000° C.; and
the mesophase-containing pitch having 30 to 80% by weight of quinoline insolubles, 40% or more of mesophase content, an upper limit of melting temperature of 400° C. and a carbonization yield at 1,000° C. of at least 70% by weight.

22. A process according to claim 21 wherein the amount of the tar relative to the graphite powder in the step (1) is so selected that the amount of the mesophase pitch formed on the graphite powder will be 3 to 150 parts by weight per 100 parts by weight of the graphite.

23. A process according to claim 21 wherein the amount of the tar relative to the graphite powder in the step (1) is so selected that the amount of the mesophase pitch formed on the graphite powder will be 5 to 50 parts by weight per 100 parts by weight of the graphite.

24. A process according to claim 21 wherein the heating in the step (2) is carried out at 400° to 500° C.

25. A process according to claim 21 wherein the pressure molding in the step (3) is carried out by heating and pressurizing the carbonaceous precursor obtained in the step (2) without preliminary calcination.

26. A process according to claim 21 wherein the heating is carried out up to a desired temperature between 800° and 3,000° C. at a speed of 150° to 3,000° C./hour, and the pressurization is carried out under a pressure of 50 to 2,000 kg/cm$^2$ (gauge).

27. A process for producing a carbonaceous composite molding comprising graphitic carbon and a carbonaceous or graphitic material derived from a mesophase-containing pitch, which comprises the four steps of:
(1) suspending graphite powder in a tar containing a mesophase pitch precursor;
(2) heating the resulting suspension system at 350° to 550° C. while blowing an inert gas thereinto or subjecting said system to reduced pressure thereby to obtain a carbonaceous precursor having mesophase pitch formed on the surface of graphite particles;
(3) pressure molding said carbonaceous precursor at 400° to 800° C. into a green molding;
(4) carbonizing or graphitizing said green molding in an inert atmosphere; and
the mesophase-containing pitch containing 50 to 100% by weight of quinoline insolubles and having a 40% or more mesophase content, an upper limit of melting temperature of 400° C., and a carbonization yield at 1,000° C. of at least 70% by weight.

28. The process of claim 27 wherein a graphitic molding is produced which has a specific resistivity of 5.0 mΩ·cm. or less and a flexural strength of 200 kg./cm.$^2$ or higher, and, when carbonized at 1,000° C., undergoes a volume change of 3% or less and a weight change of 3% or less.

29. A process for producing a carbonaceous composite molding comprising graphitic carbon and a carbonaceous or graphitic material derived from a mesophase pitch, which comprises the three steps of:
(1) suspending graphite powder in a tar containing a mesophase pitch precursor;
(2) heating the resulting suspension at 350° to 550° C. while blowing an inert gas thereinto or subjecting said suspension to a reduced pressure thereby to obtain a carbonaceous precursor having mesophase pitch formed on the graphite particles; and
(3) pressure molding said carbonaceous precursor at 800° to 3,000° C.; and
the mesophase-containing pitch containing 50 to 100% by weight of quinoline insolubles and having a 40% or more mesophase content, an upper limit of melting temperature of 400° C., and a carbonization yield at 1,000° C. of at least 70% by weight.

30. A process for producing a carbonaceous or graphitic composite molding comprising a filler of at least one material in powder form selected from the group consisting of graphitic carbon, carbonaceous carbon, metals, metal compounds and other inorganic compounds qualified as a filler to a carbonaceous or graphitic molding derived from a mesophase-containing pitch, which comprises the four steps of:
(1) suspending a filler comprising at least one material in powder form selected from the group consisting of graphitic carbon, carbonaceous carbon, metals, and metal compounds or other inorganic compounds qualified as a filler to a carbonaceous or graphitic molding in a tar containing a mesophase pitch precursor;
(2) heating said suspension system to evaporate the light distillates contained in the tar by blowing of an inert gas into the suspension or by subjecting the suspension to a reduced pressure and subjecting said mesophase pitch precursor to heat treatment at 350° to 500° C. to obtain a carbonaceous precursor having a mesophase-containing pitch formed on the surface of said material;
(3) molding said carbonaceous precursor into a green molding containing mesophase-containing pitch; and
(4) providing said green molding for carbonization or graphitization reaction in an inert atmosphere to form a carbonaceous or graphitic composite; and
the mesophase-containing pitch precursor contains 30 to 80% by weight of quinoline insolubles and in which the mesophase-containing pitch has a 40% or more mesophase content, an upper limit of melting temperature of 400° C. and a carbonization yield at 1,000° C. of at least 70% by weight.

31. The process of claim 30, wherein a graphitic composite is produced which has a specific resistivity of 5.0 mΩ·cm. or less and a flexural strength of 200 kg./cm.$^2$ or higher, and, when carbonized at 1,000° C., undergoes a volume change of 3% or less and a weight change of 3% or less.

* * * * *